Sept. 9, 1958  F. G. KELLY  2,851,663
DYNAMOMETER INSTRUMENT
Filed May 11, 1954
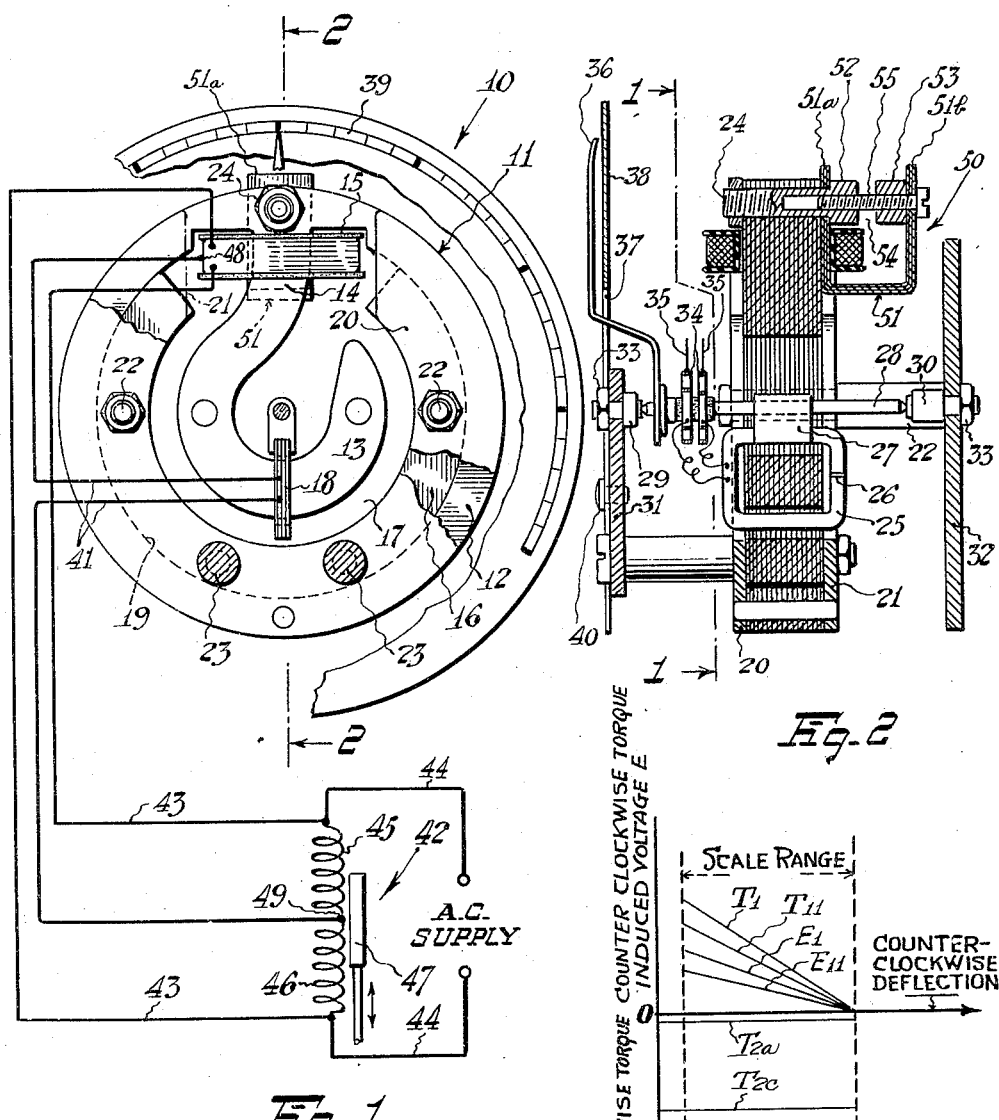
INVENTOR
Frederick G. Kelly
BY George H. Fritzinger
Agent United States Patent Office 2,851,663
Patented Sept. 9, 1958

2,851,663

DYNAMOMETER INSTRUMENT

Frederick G. Kelly, Bloomfield, N. J., assignor, by mesne assignments, to McGraw-Edison Company, Elgin, Ill., a corporation of Delaware Application May 11, 1954, Serial No. 428,999

4 Claims. (Cl. 324—144)

This invention relates to dynamometer instruments of the type disclosed in my Patent No. 2,572,626 dated October 23, 1951. Objects of my invention are to provide improvements in such instruments adapted to render them more efficient, more economical to produce and easier to adjust and calibrate.

A particular object of my invention is to provide a novel means for adjusting the deflection range of the moving indicating element of such dynamometer instruments for any given range of the variable quantity under measurement.

A more specific object is to attain the aforestated objective by adjusting the reluctance of an auxiliary magnetic circuit separate from the main magnetic structure of the instrument and linking only the field coil.

Another object of my invention is to provide a novel magnetic field structure for such dynamometer instruments which has great mechanical stability and which is adapted to permit the mounting thereon of a prewound field coil while enabling a very low magnetic reluctance to be achieved. In this connection my invention comprehends a closed magnetic ring with an integral, inwardly-extending shank terminating in a hook-shaped magnetic core having a sufficiently large peripheral spacing from the ring to enable the field coil to be threaded into place on the shank by way of the core, and the insertion after the field coil is mounted of a magnetic filler element adapted to close to the desired extent the gap between the core and the ring, wherein the magnetic filler element has such large area of contact with the ring as not to introduce any substantial reluctance into the effective magnetic circuit by reason of its being detachable from the main magnetic structure.

These and other objects and features of my invention will be apparent from the following description and the appended claims.

In the description of my invention reference is had to the accompanying drawings, of which:

Figure 1 is a fractional view of a dynamometer instrument according to my invention taken on the line 1—1 of Figure 2, and showing also an operative electrical circuit therefor including a transmitter device, the transmitter device being however shown only diagrammatically;

Figure 2 is a principally sectional view of the instrument taken on the line 2—2 of Figure 1; and Figure 3 is a graph showing certain voltage and torque relations to armature deflection which occur in the system.

The dynamometer instrument 10, herein shown as being of the long-scale variety, comprises a closed field structure 11 of laminated non-permanent magnetic material comprising a magnetic ring 12 having an inner hook-shaped core 13 hereinafter referred to as the "hook," which is joined integrally to the ring by way of a radially-extending shank member 14. The hook is spaced considerably from the inner peripheral wall of the ring to enable a prewound field coil 15 to be threaded onto the shank 14 by way of the hook 13 with one side of the coil passing through the space between the hook and the ring. After the field coil is so mounted a C-shaped magnetic filler member 16, also of laminated material, is inserted into the ring to close the gap between the hook and the ring to an extent providing only a sufficient clearance air gap 17 between it and the hook for movement therethrough of an armature coil 18 along the core. The C-shaped magnetic filler member is positioned in close juxtaposition to the inner peripheral wall 19 of the ring 12 throughout the arcuate length of the hook 13 so that the physical break between it and the ring will not introduce any appreciable magnetic reluctance in the operating magnetic circuit of the instrument. Were the shank made separable from the ring to permit the mounting thereon of a prewound field coil, there would be introduced into the operating magnetic circuit a substantial magnetic reluctance which would reduce the efficiency of the instrument. Also, were the shank made separable from the ring, it would be difficult to hold the hook in fixed relation to the ring so as to maintain the air gap 17 uniform should the instrument be subjected to severe shock during shipment or to heavy vibration during service. In this connection, it is important to note that if the present instrument is to be of a precision character the air gap 17 must be maintained uniform to within approximately one thousandth of an inch.

The magnetic filler member 16 is located accurately relative to the hook by an arcuate gap spacer (not shown) to assure that the air gap 17 will be precisely uniform, and is then secured firmly in place by C-shaped clamping members 20 and 21 at opposite sides of the ring and filler members. These clamping members are secured tightly together by four stud screws, two of which are on the diameter line of the instrument and are referred to as 22, and the other two of which are grouped at the lower part of the instrument as seen in Figure 1 and are referred to as 23. Additionally, the laminations of the ring of the main field structure are clamped together at the upper end of the instrument by a stud screw 24.

The armature coil 18 is typically wound on a light metal frame 25 having an air gap 26 to prevent a shorted turn for the A. C. flux through the coil. At one side of this frame there is a lug 27 joined to a spindle 28. The spindle has cone-shaped ends pivotally engaging respective bearings 29 and 30. The bearing 29 is carried by a front plate 31 itself mounted on the two studs 23 aforementioned, and the bearing 30 is carried by the back plate 32 itself mounted on the two stud screws 22 aforementioned. According to usual practice, each bearing 29 and 30 is mounted for adjustment lengthwise of the spindle and is secured in place as by a lock nut 33. Lead connections to the armature coil are made by way of respective hair springs 34 having the inner ends secured insulatedly to the spindle and electrically connected to the armature coil, but having the outer ends connected to fixed terminals 35. At the forward end of the spindle there is secured a pointer 36 which is offset forwardly to pass through a central opening 37 of a dial 38 and to overlie a scale 39 on this dial. The dial is mounted on the other side of the frame plate 31 and secured thereto by screws 40.

The armature coil is connected in a closed circuit which constitutes the diagonal arm of an electrical bridge. One branch of this bridge comprises the field coil 15 and the other branch comprises a transmitter 42. The field coil and transmitter are connected in parallel by leads 43 and are connectable to a common source of A. C. potential by leads 44. The transmitter may for example be of the inductance type disclosed in my pending application Serial No. 290,869, filed May 31, 1952, now Patent No. 2,740,941. For present purposes, a disclosure of structural details of this transmitter is unnecessary, it being sufficient merely to say that the transmitter comprises two serially-connected coils 45 and 46, and an associated magnetic armature 47 which is moved according to the quantity or condition under measurement to cause the inductance of one transmitter coil to increase and concurrently that of the other coil to decrease. The diagonal circuit 41 of the bridge is connected from a tap 48 of the field coil to a junction or tap 49 between the coils of the transmitter. As the bridge is unbalanced by movement of the armature 47 of the transmitter, the potential of the tap 49 is varied relative to that of the tap 48 to cause a voltage to be impressed on the armature coil of the dynamometer instrument.

The present dynamometer instrument operates on the null balance principle, which is that at each indicating position of the instrument the net torque acting on the armature coil is zero. The net torque may be considered, for purposes of explanation, as comprising two opposing torque components. One of these components is derived from the voltage induced in the armature coil and the other is derived from the voltage impressed on the armature coil because of unbalance of the electrical bridge.

The induced voltage varies according to the linkage of flux of the field coil 15 with the armature coil. When the air gap 17 is nearly uniform as aforementioned, the linkage varies substantially uniformly from a maximum when the armature coil is at the shank 14 to a minimum of substantially zero, discounting the effect of leakage flux, when the armature coil is at the end of the hook. Thus, the induced voltage $E_1$ varies substantially linearly with deflection as represented in the graph of Figure 3. When the armature circuit has an inductive reactance—which it will have in the present illustrative embodiment by reason of the transmitter being of the inductance type—the current component resulting from the induced voltage $E_1$ is in lagging phase relation to the flux of the air gap to produce a torque component $T_1$ tending to move the armature coil towards the end of the hook. This torque component, being proportional to the product of the induced voltage and the field flux, will vary linearly in the manner of the induced voltage as shown in Figure 3.

The transmitter is so arranged that in the operation of the instrument the voltage impressed on the armature coil is in at least partial phase opposition to the induced voltage $E_1$ to produce a second torque component $T_2$ opposing the torque component $T_1$. This second torque component will not vary with deflection of the armature but will vary with change in unbalance of the electrical bridge caused by movement of the armature of the transmitter. For any given value of this second torque component within the range of variation of the first torque component, the armature will come to a stable indicating position whereat these torque components are substantially in balance. Thus, variations in this second torque component as from $T_{2a}$ to $T_{2b}$, corresponding to variations in the impressed voltage through the range of variation of the induced voltage, will cause a full range of deflection of the armature coil from the shank 14 to the end of the hook 13.

For convenience of scale span adjustment and calibration there is a great need for convenient and simple means for adjusting the deflection range of the pointer for any given range of variation of the quantity or condition under measurement. It has been found in accordance with the present invention that the deflection range can be so adjusted by an adjustable magnetic circuit 50 separate from the main field structure and threading only the field coil. This adjustable magnetic circuit comprises in its preferred form a U-shaped member 51 of magnetic material, preferably laminated, having one leg 51a thereof extending through the field coil and lying flat against the ring 12. The end portion of this leg 51a is apertured and traversed by the stud screw 24 to hold the member 51 firmly in place. The head 52 of the stud screw is made of magnetic material and becomes one pole member of the adjustable magnetic circuit. A similarly-shaped pole member 53 of magnetic material is secured to the other leg 51b of the magnetic member 51 to provide an air gap 54 therebetween. The pole member 53 has a clearance opening through which passes the shank of a headed adjustable screw 55, and the pole member 52 has a threaded opening which this screw engages, the screw being made of non-magnetic material so that it will not provide an iron path across the gap 54. Upon adjusting the screw 55 the gap 54 is varied to change the reluctance of the magnetic circuit around the field coil and to vary the deflection range of the pointer for a given range of variation of the condition or quantity being measured.

The manner in which the adjustable magnetic circuit 50 influences the scale range of the present dynamometer instrument may be described as follows: Consider for instance that the gap 54 is decreased. This decrease of the gap increases the permeance of the magnetic circuit 50 and increases the inductance of the field coil 15. The increased inductance of the field coil reduces the current therein with consequent reduction in the voltage induced in the armature coil. Since the induced voltage is dependent on the flux linkage and the flux linkage falls always to zero as the armature coil is moved to the end of the hook, discounting minor effects of leakage flux, the decreased induced voltage resulting from the shortening of the gap 54 causes the induced voltage-deflection characteristic to become a line of decreased slope as indicated by line $E_{11}$ of Figure 3. The resultant torque-deflection characteristic resulting from this lower induced voltage will likewise become a line of decreased slope as indicated by line $T_{11}$ of Figure 3. Thus, a smaller range of variation of the torque component $T_2$ as from $T_{2a}$ to $T_{2c}$ instead of from $T_{2a}$ to $T_{2b}$, referring again to Figure 3, will balance the opposing torque component $T_{11}$ throughout the entire deflection range. In other words, a given range of variation of the quantity or condition under measurement will now result in a greater range of deflection. Vice versa, if the gap 54 is increased by outwardly threading the adjusting screw 55, the same range of variation of the quantity or condition under measurement will result in a smaller range of deflection. Accordingly it will be observed that the auxiliary magnetic circuit 50 becomes a simple and very convenient means for adjusting the deflection range of a dynamometer instrument of the character here shown and described.

The foregoing showing and description of my invention is intended to be illustrative and not necessarily limitative of my invention since the same is subject to changes and modifications without departure from the scope of my invention, which I endeavor to express according to the following claims.

I claim:

1. In a dynamometer instrument of the null balance type: the combination of a magnetic field structure including a closed magnetic ring having an integral inwardly-extending shank member terminating in an arcuate pole member spaced from the ring to provide an arcuate air gap therebetween and a magnetic circuit completed by way of said gap; a field coil threaded by said shank member of said field structure for producing a flux across said gap; an armature coil pivoted at the center of curvature of said arcuate pole member and surrounding said arcuate pole member to have a decreasing inductive coupling with said field coil, causing the voltage induced therein to decrease, as the armature coil is moved towards one end of said arcuate pole member; a closed circuit for said armature coil adapted to cause said armature coil to be propelled towards said one end of said arcuate pole member in response to the reaction between said flux and the current resulting from said induced voltage; variable electrical means in said armature circuit for providing a variable voltage at least partially in phase opposition to said induced voltage tending to propel said armature coil away from said one end of said arcuate pole member and causing the armature coil to seek a position wherein said propelling forces are in balance; and means for changing the range of deflection of said armature coil for a given range of voltage variation in said armature circuit caused by said variable electrical means, comprising magnetic means providing a magnetic circuit for said field coil in nonlinking relation to said armature coil, said magnetic circuit having therein an air gap; and adjustable means for varying said air gap of said magnetic circuit.

2. In a dynamometer instrument: the combination of a magnetic field structure comprising a closed magnetic ring having an integral inwardly-extending shank member terminating in an arcuate pole member spaced substantially from said ring; a field coil adapted to be threaded onto said shank member by way of said arcuate pole member with one side of the coil passing through the space between the arcuate pole member and said ring; an armature coil under influence of said field coil positioned in surrounding relation to said arcuate pole member and mounted for pivotal movement along said pole member about the axis of curvature of said pole member; and an arcuately-shaped magnetic member positioned in said ring in close magnetic contact therewith and having its inner wall at a clearance spacing from said mounted armature coil for effectively reducing the air gap between said arcuate pole member and said ring to a minimal value after the mounting of said field coil, said arcuately-shaped magnetic member being in contact with said ring throughout the angular deflection range of said armature coil so that a minimal reluctance is produced between it and the ring.

3. In a dynamometer instrument: the combination of a magnetic field structure comprising a closed magnetic member having an integral shank member extending therefrom and terminating in a pole member spaced substantially from said closed magnetic member; a field coil adapted to be threaded onto said shank member by way of said pole member with one side of the coil passing through the space between the pole member and said closed member; an armature coil under influence of said field coil positioned in surrounding relation to said pole member and mounted for movement therealong; and a magnetic filler member positioned in close magnetic contact with said closed member between the latter and said pole member for effectively reducing the air gap between the closed member and pole member after mounting of said field coil to a value only sufficient to provide clearance space for said armature coil.

4. In a dynamometer instrument including a source of alternating current and a field coil energized by said source: the combination of a magnetic core passing through said field coil and having spaced pole pieces providing an air gap; an armature coil mounted for movement in said gap and having a varying magnetic coupling with said field coil causing a varying voltage to be induced therein as the armature coil is moved; an electrical circuit including said armature coil and a source of voltage variable according to variations in a condition to be measured for providing a voltage in the circuit in opposition to the voltage induced in said armature coil whereby the armature coil seeks a null position wherein said opposing voltages tend to be in balance; and means for changing the range of movement of said armature coil for a given range in variation in said condition, comprising means for adjusting the magnetic coupling between said field coil and said armature coil, said adjusting means comprising a second magnetic core passing through said field coil for diverting flux away from said armature coil, said second core having therein an adjustable means for varying the reluctance of the core.

References Cited in the file of this patent

UNITED STATES PATENTS

| | | |
|---|---|---|
| 824,696 | Lehr | June 26, 1906 |
| 2,160,416 | Green | May 30, 1939 |
| 2,456,171 | Bernreuter | Dec. 14, 1948 |
| 2,465,053 | Baranowski | Mar. 22, 1949 |
| 2,485,657 | Rex | Oct. 25, 1949 |
| 2,515,375 | Kelly | July 18, 1950 |
| 2,572,626 | Kelly | Oct. 23, 1951 |